Nov. 5, 1929.  H. D. CLEMMONS  1,734,762
BALL COCK
Filed May 9, 1928
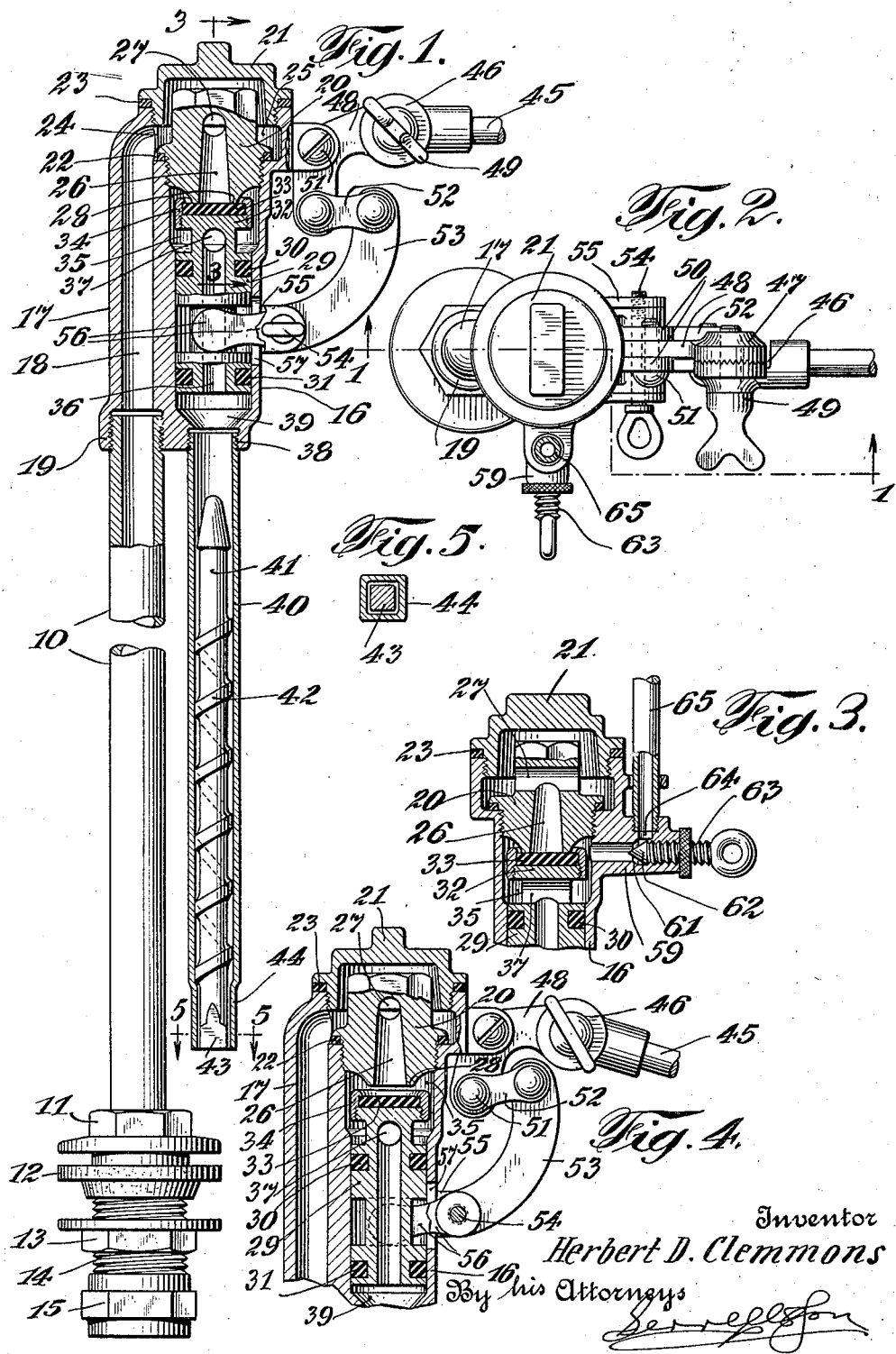
Inventor
Herbert D. Clemmons
By his Attorneys Patented Nov. 5, 1929

1,734,762

UNITED STATES PATENT OFFICE

HERBERT D. CLEMMONS, OF STURGIS, MICHIGAN, ASSIGNOR TO SCOVILL MANUFACTURING COMPANY, OF WATERBURY, CONNECTICUT, A CORPORATION OF CONNECTICUT

BALL COCK

Application filed May 9, 1928. Serial No. 276,223.

My present invention relates to a ball cock or that type of apparatus commonly employed for admitting and automatically shutting off the supply of water to toilet tanks and similar fittings. In this type of apparatus it is customary to operate an inlet and shut-off valve by means of a float ball, the operation being such that when the water is withdrawn from the tank for flushing or other purposes the float ball drops and opens the valve for admitting the water supply and as the tank fills the float ball rises and eventually closes the valve to shut off the water supply. Heretofore various forms of ball cocks have been employed and efforts have been made to so construct these devices as to cause them to operate quickly and quietly. In this type of valve, furthermore, it has been customary to discharge the water through the body or casing of the ball cock into a hush tube in which a discharge retarder may be employed. Experience has demonstrated the difficulty of designing an apparatus of this type which will operate quickly and quietly on varying water pressures. In the present instance instead of discharging the water through the body of the ball cock into the hush tube I propose to discharge the water through the plunger which operates the control valve and by the construction of the plunger, or piston, and the body in which it operates to eliminate the hissing or whistling sound created by the water, particularly at the time the valve closes, and to also provide a means for assisting the operation of the plunger in closing the valve to thereby relieve the work done by the float ball, to provide for the ready removal of the hush tube and the elimination of the retarding device, for the interchangeability of the retarding devices in order to produce a ball cock which will operate quickly and quietly on substantially any water pressure which is ordinarily employed, varying as it does from approximately fifty pounds in some instances to two hundred pounds in other instances.

In carrying out the invention the apparatus is also so constructed as to be suitable for replacement work and as such may be installed in any type of closet tank irrespective of how close the inlet opening in the bottom of the tank may be to the end or side walls thereof. For this purpose the operating parts of the device and the lever mechanism are arranged to lie entirely on one side of the inlet pipe which, of course, when installed is that opposite the end or adjacent wall of the closet tank.

The ball cock made in accordance with my invention will be hereinafter more particularly described in conjunction with the accompanying drawings in which Figure 1 is an elevation and a partial longitudinal section illustrating my improved ball cock, this section being taken on line 1—1, Fig. 2, Fig. 2 is a plan of the ball cock, Fig. 3 is a section on line 3—3, Fig. 1, Fig. 4 is a partial section similar to Fig. 1 showing the parts in a position in which the valve is open, and Fig. 5 is a section on line 5—5, Fig. 1.

In carrying out the invention the ball cock made in accordance therewith is constructed to include an inlet or stand pipe 10. This inlet pipe is fitted with a positioning nut 11 and gasket 12, together with a clamp nut 13 arranged on a bushing 14 to which there may also be connected a suitable nipple 15 for connection with a service pipe.

These parts, as will be understood, are employed in connecting the ball cock in place in the flush tank.

The ball cock also includes a valve and plunger casing 16. This is constructed to have an offset rib 17 through which there is a passage 18. At the inner or lower end of the casing and in line with the passage 18 there is a tapped socket 19 for the reception of the upper or outer end of the inlet pipe 10. The casing is provided with a plug 20 and a cap 21. As illustrated a gasket 22 is placed between the plug 20 and the casing to make a tight joint and for like reasons a gasket 23 is preferably placed between the cap 21 and the casing. In the wall of the casing there is a port 24 making communication between the passage 18 and a chamber 25 in the upper or outer end of the casing. This chamber is inclosed by the cap 21 and contains the plug 20. Centrally disposed in the plug 20 there is a passage 26 and also in the plug there is a port or ports 27 making communication between the inlet chamber 25 and the passage 26. At the inner end of the plug 20 there is a valve seat 28 which, as illustrated, surrounds the discharge end of the passage 26.

The body of the casing is preferably cylindrical and is adapted to receive a plunger or piston 29. This plunger 29 is fitted with packing rings 30 and 31 operating in the body of the casing and at its upper or outer end the plunger terminates in a head 32. On the head of the plunger there is a valve 33. This is preferably made of any suitable material. The valve is maintained in position relatively to the plunger by means of a ring 34 or in any other suitable manner. The upper or outer end of the body of the casing is slightly larger in diameter than that in which the plunger operates so as to provide a chamber 35, the diameter of which is greater than that of the ring 34.

This chamber 35 is what may be called a huddling chamber and to this feature further reference will be hereinafter made.

Extending through the plunger there is a passage 36 terminating immediately below the head 32 where there is a lateral port or ports 37 making communication between the chamber 35 and the passage 36 in the plunger.

At the inner or lower end of the casing there is a discharge opening 38. This opening is of materially smaller diameter than that of the cylinder in which the plunger operates whereby there is provided a chamber 39 below the lower end of the plunger and between the same and this discharge outlet. This chamber 39 is what may be termed a back pressure chamber and to which further reference will also be hereinafter made. The discharge outlets 38 is preferably tapped to receive a hush or discharge tube 40. Within this tube 40 I may employ a discharge retarder 41, comprising a rod having a spirally disposed rib 42 adapted to fit within the tube. In order to prevent this discharge retarder from turning relatively to the tube the lower end thereof may be provided with flat faces preferably square, as indicated at 43, and the lower end of the tube flattened and made square, as indicated at 44, to receive the flattened end of the rod and to prevent the same from turning relatively thereto. This discharge retarder is, therefore, readily removable from the tube and the tube itself is easily removed from the casing whereby in operating under low pressure heads the hush tube may be removed, the discharge retarder taken therefrom, and the hush tube replaced in order thereby to entirely eliminate the use of the retarder, or, as will be understood, different retarders may be employed, depending upon the pressure under which the ball cock is made to operate.

The plunger is actuated to open and close the valve by means of the customary float ball. The float ball is connected to the free end of a rod 45. At the opposite end of this rod the same is fitted with a bracket having a flange with a serrated surface 46 adapted to co-operate with a correspondingly serrated surface in the head 47 at the end of a lever 48. The serrated surfaces may be adjusted relatively to one another and these parts connected by a screw 49 or otherwise, depending upon the position it is necessary for the float ball to assume when the flush tank is filled with water. The lever 48 is mounted between lugs 50 provided for this purpose on the casing and the lever is adapted to swing on a pivot pin 51, as illustrated. The other end of the lever 48 is connected by a link 52 to one end of a lever 53. This lever 53 is adapted to swing on a pivot pin 54 mounted in lugs 55 provided for this purpose on the casing. The opposite end of the lever 53 is bifurcated and extends into the casing through an opening 57 therein so that the bifucated end 56 of the lever 53 lies in a recessed portion of the plunger as is clearly illustrated in Figs. 1 and 4.

The apparatus may also be constructed to provide for the refill feature which it is customary to use in apparatus of this type. To this end the casing is constructed to include a boss 59 in which there is a passage 60 leading from the chamber 35. In this passage there is a seat 61 for a valve 62 carried at the end of an adjusting screw 63. The boss 59 is fitted with a tapped discharge opening 64 in which one end of the refill pipe 65 is secured. It will be understood that the opposite end of this refill pipe is placed in any suitable manner so that the flow of water therethrough will reach the bowl, or other fitting.

In the operation of the ball cock as hereinbefore described the parts normally assume the positions shown in Fig. 1 wherein the valve 33 is closed. The water supply from the service pipe fills the inlet pipe 10, the passage 18, the inlet chamber 25, and the passage 26 in the plug 20. Now upon the operation of the float ball by falling in the tank due to the withdrawal of the water therefrom, the lever 48 swings on its pivotal point and by means of the link 52 swings the lever 53 on its pivotal point, causing the bifurcated end of the lever to move inwardly or downwardly and imparting a corresponding movement to the plunger to unseat the valve. By so doing the water is permitted to flow into the huddling chamber 35, through the ports 37 to the passage 36, thereby flowing through the plunger and to the back pressure chamber 39 whence the water flows through the hush tube 40 to the tank. As the tank fills the float ball rises moving the parts in the opposite directions until eventually the valve is brought to bear against its seat 28 to again shut off the supply. In so doing, as will now be understood, there is a back pressure created in the chamber 39 depending upon the pressure of the supply which tends to lift the plunger and reseat the valve, thereby relieving the float ball of a certain amount of work and making it possible to employ a smaller float ball than would otherwise be required. Furthermore, in view of the fact that the water necessarily has to flow through the annular chamber surrounding the valve the customary hissing or whistling noise created when the valve is about to close is eliminated in the use of this construction. Then again, it will also be apparent that the hush tube 40 is readily removable and the discharge retarder may be either eliminated entirely for operation on low water pressure or the discharge retarder may be interchanged, depending upon the pressure of the water in order to effect the desired quiet or silent discharge of the water in the tank. It will also be understood that in view of the square section employed at the inner or lower end of the discharge retarder and the square end of the hush tube in which the end of the discharge retarder is fitted, that the discharge retarder when employed cannot turn relatively to the hush tube irrespective of the water pressure with which the ball cock is made to operate. It is furthermore to be observed that because of the fact that the body of the ball cock casing and the parts associated therewith for operating the apparatus are all on the same side of the inlet pipe that the apparatus may be used in replacement work irrespective of how close to the end wall of the tank the inlet opening in the bottom thereof may be.

I claim as my invention:

1. In a ball cock, a casing, a plunger having a longitudinal passage and a lateral port therein, a valve carried by the plunger, there being a chamber in the casing surrounding the said valve, a valve seat member, there being an inlet chamber surrounding the valve seat member which is provided with a centrally disposed passage and a lateral port, communication between the inlet chamber and the chamber surrounding the valve being controlled by the said valve, and means for actuating the plunger to operate the valve.

2. In a ball cock, a casing, a plunger operating the casing and having a longitudinal passage and a lateral port therein, a valve carried by the said plunger, there being a chamber in the casing surrounding the said valve, a plug having a passage and lateral port therein with a valve seat at the end of the said passage, there also being an inlet chamber surrounding the said plug, communication between the inlet chamber and the chamber surrounding the valve being through the port and the passage in the plug and controlled by the valve, and means for actuating the said plunger to operate the valve.

3. In a ball cock, a casing, a plunger operating in a portion of the said casing and having a longitudinal passage and a lateral port therein, a valve at the inlet end of the plunger, a plug having a passage and a lateral port therein with a valve seat at the discharge end of the said passage, the plug closing a chamber surrounding the said valve, a cap at the outer end of the said casing and closing an inlet chamber surrounding a portion of the said plug, communication between the inlet chamber and the chamber surrounding the valve being by way of the port and the passage in the plug and controlled by the said valve, and means for actuating the plunger to operate the said valve.

4. In a ball cock, a casing having an inlet chamber at the outer end thereof, a plunger operating in a portion of the casing and having a longitudinal passage and a transverse port therein, a valve carried by the plunger for controlling the flow of water from the inlet chamber to the pasage in the plunger, there being an outlet opening in the casing, and a back pressure chamber between the said outlet opening and the outlet end of the plunger, and means for actuating the plunger to operate the valve.

5. In a ball cock, a casing having a longitudinally disposed offset inlet opening and an inlet chamber at the outer end of the casing, said inlet opening being adapted to have connected therein an inlet pipe leading from a source of supply, a plunger operating in a portion of the casing and having a longitudinal passage and transverse port therein, a valve carried by the plunger for controlling the flow of water from the inlet chamber to the port and passage in the plunger, there being an outlet opening in the casing adjacent the outlet end of the plunger, a hush tube connected to the said outlet opening, and means for actuating the plunger to operate the valve.

6. In a ball cock, a casing having an inlet chamber at the outer end thereof, a plunger operating in a portion of the casing and having a longitudinal passage and a transverse port therein, a valve carried by the plunger and adapted to control the flow of water from the inlet chamber to the port and passage in the plunger, there being an outlet opening in the casing adjacent the outlet end of the plunger, a hush tube removably connected in the outlet opening, and means for actuating the plunger to operate the valve.

7. In a ball cock, a casing having an inlet chamber at the outer end thereof, a plunger operating in a portion of the casing and having a longitudinal passage and a transverse port therein, a valve carried by the plunger and adapted to control the flow of water from the inlet chamber to the port and passage in the plunger, there being an outlet opening in the casing adjacent the outlet end of the plunger, a hush tube removably connected to the said outlet opening, a discharge retarder in the said hush tube, and means for actuating the plunger to operate the valve.

8. In a ball cock, a casing, a plunger operating in a portion of the casing, a valve carried by the plunger for controlling the flow of water through the casing, there being a discharge opening in the said casing, a hush tube connected in the discharge opening, the free end of the hush tube being flat sided, a discharge retarder in the hush tube and having a flat sided extremity adapted to lie within the flat sided end of the hush tube, and means for actuating the plunger to operate the valve.

Signed by me this 2nd day of May, 1928.

HERBERT D. CLEMMONS.